United States Patent [19]

Vasta

[11] 4,147,674

[45] Apr. 3, 1979

[54] AQUEOUS COATING COMPOSITION OF AN ACRYLIC-VINYL OXAZOLINE ESTER POLYMER

[75] Inventor: Joseph A. Vasta, Woodbury, N.J.

[73] Assignee: E. I. Du Pont de Nemours and Company, Wilmington, Del.

[21] Appl. No.: 856,505

[22] Filed: Dec. 1, 1977

[51] Int. Cl.$^2$ .......................... C08L 1/10; C08L 1/14
[52] U.S. Cl. .............................. 260/17 R; 260/22 CB; 260/23 AR; 260/29.6 HN; 260/29.6 NR; 526/260; 427/388 C; 428/461; 428/463
[58] Field of Search ................. 260/23 AR, 29.6 HN, 260/22 CB, 29.6 NR, 17 R; 526/260; 428/461, 463; 427/388 C

[56] References Cited

U.S. PATENT DOCUMENTS

| | | | |
|---|---|---|---|
| 3,535,291 | 10/1970 | Riemhofer et al. | 526/260 |
| 3,553,124 | 1/1971 | Danatello et al. | 260/23 AR |
| 3,585,160 | 6/1971 | Miller et al. | 260/22 CB |
| 3,661,632 | 5/1972 | Gagliardi et al. | 260/29.6 HN |
| 3,711,433 | 1/1973 | Willey | 260/23 AR |
| 3,753,935 | 8/1973 | Miller | 260/22 CB |
| 4,007,306 | 2/1977 | Poy et al. | 260/29.4 UA |

FOREIGN PATENT DOCUMENTS 1134050  11/1968  United Kingdom .................... 526/260

*Primary Examiner*—Melvyn I. Marquis

[57] ABSTRACT

An aqueous coating composition having a film-forming binder of a polymer of
(a) methyl methacrylate, styrene or a mixture of methyl methacrylate and styrene,
(b) a vinyl oxazoline ester of drying oil fatty acids, and
(c) and ethylenically unsaturated carboxylic acid; and contains sufficient ammonia or amine to provide a pH of about 7.5-9.5.

The composition is a non-air polluting coating composition designed to be used as a finish for automobile and truck bodies.

17 Claims, No Drawings

4,147,674

AQUEOUS COATING COMPOSITION OF AN ACRYLIC-VINYL OXAZOLINE ESTER POLYMER

BACKGROUND OF THE INVENTION

This invention is related to an aqueous coating composition and in particular to an aqueous coating composition that is useful for finishing automobile and truck bodies.

Currently solvent based coating compositions are used to finish automobile and truck bodies and repair damaged finishes of automobile and truck bodies. Typical solvent based coating compositions that are currently being used are shown in Walus et al., U.S. Pat. No. 3,488,307, issued Jan. 6, 1970; Donatello et al., U.S. Pat. No. 3,553,124, issued Jan. 5, 1971; Miller et al., U.S. Pat. No. 3,585,160 issued June 15, 1971; Willey et al., U.S. Pat. No. 3,711,433 issued Jan. 16, 1973 and Miller U.S. Pat. No. 3,844,993 issued Oct. 29, 1974. Air pollution regulations in a number of states require that plants manufacturing automobiles and trucks meet solvent emission standards that allow for very low levels of solvents in coating compositions. Also, it is anticipated that pollution regulations in many states will require that coating compositions used by commercial automobile and truck repair facilities meet low solvent emission standards.

There is a need for a water-based coating composition that will meet the following requirements: comply with pollution regulations, dry to a hard glossy durable finish under ambient temperature conditions, have excellent adhesion to the substrates to which the composition is applied, have resistance to water spotting and to gasoline and retain its gloss when subjected to exterior weathering conditions. The novel composition of this invention meets the aforementioned requirements.

SUMMARY OF THE INVENTION

The aqueous coating composition of this invention comprises about 5-60% by weight, based on the weight of the coating composition, of a film forming binder and 40-95% by weight, based on the weight of the coating composition, of an aqueous medium; wherein the film forming binder comprises a polymer of (a) about 40-60% by weight, based on the weight of the polymer, of polymerized methyl methacrylate, styrene or a mixture of methacrylate and styrene;

(b) about 20-57% by weight, based on the weight of the polymer, of polymerized vinyl oxazoline ester of the formula

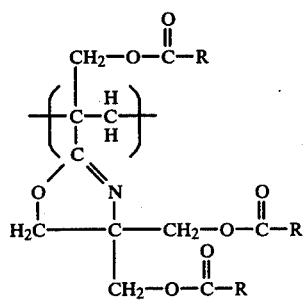

where R is from drying oil fatty acids, and (c) about 3-20% by weight, based on the weight of the polymer, of an ethylenically unsaturated carboxylic acid; and contains sufficient ammonia or amine to provide a pH of about 7.5-9.5.

DESCRIPTION OF THE PREFERRED EMBODIMENTS

The coating composition contains about 5-60% by weight of a film forming binder and about 40-95% by weight of aqueous medium which can contain up to about 20% by weight of an organic solvent for the binder. The coating composition usually contains pigments in a pigment to binder weight ratio of about 0.1/100 to 300/100. For conventional application of the composition, about 25-45% of film forming binder with 55-75% by weight of an aqueous medium is used.

The film forming binder is an acrylic-vinyl oxazoline ester polymer that is prepared by conventional polymerization process in which monomers, initiator and solvents are charged into a conventional polymerization vessel and heated to about 50°-250° C. for about 0.5-6 hours to form the polymer. Usually a temperature of about 100°-175° C. is used for about 2-4 hours. The resulting polymer has a weight average molecular weight of about 20,000 to 110,000 and a number average molecular weight of about 2,000 to 10,000 determined by gel permeation chromatography using polystyrene as a standard. The polymer has an acid number of about 20 to 160.

About 0.1-4% by weight, based on the weight of the monomers used to prepare the polymer, of a polymerization initiator is utilized. Typical initiators are azo-bis-isobutyronitrile, azo-bis (α, γ-dimethylvaleronitrile), benzoyl peroxide, ditertiary butyl peroxide, tertiary butyl perbenzoate, and tertiary butyl peroxypivalate. Chain transfer agents can be used to control the molecular weight such as 2-mercaptoethanol, lauryl mercaptan, and the like.

Typical solvents that can be used in the polymerization process are methanol, isopropanol, n-propanol, diacetone alcohol and other alcohols, acetone, acetyl acetone, ethylene glycol monoethylether, ethylene glycol monobutylether, diethylene glycol monobutylether, ethylene glycol monomethylether acetate, and the like. Solvents of limited water solubility can also be used such as methyl ethyl ketone, ethylene glycol monoethylether acetate and the like. Under some circumstances the polymer can be made without the use of a solvent.

About 40-60% by weight, based on the weight of the polymer, of methyl methacrylate, styrene or a mixture of methyl methacrylate and styrene are used to form the polymer. Up to 10% by weight, based on the weight of the polymer, of an alkyl methacrylate having 6-12 carbon atoms in the alkyl group such as hexyl methacrylate, octyl methacrylate, nonyl methacrylate, lauryl methacrylate and the like can be used to form the polymer.

About 20-57% by weight based on the weight of the polymer, of a vinyl oxazoline ester monomer is used of the following formula

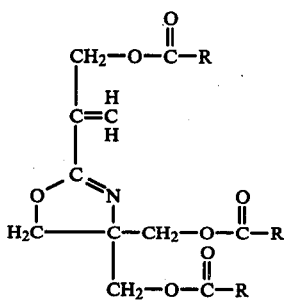

where R is from drying oil fatty acids such as soya oil fatty acids, linseed oil fatty acids, tall oil fatty acids or mixtures thereof.

The vinyl oxazoline esters can be made according to Purcell U.S. Pat. No. 3,248,397, issued Apr. 26, 1966. One preferred compound of this type is a reaction product of 1 mol of tris-(hydroxymethyl)-amino methane and 3 mols of linseed oil or soya oil fatty acids which is subsequently reacted with formaldehyde.

Current analytical information shows that commercially available vinyl oxazoline esters contain up to 30% by weight of unvinylated oxazoline ester and usually about 10–30% by weight of unvinylated oxazoline ester of the formula

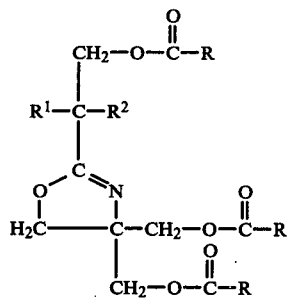

where R is from drying oil fatty acids, and $R^1$ and $R^2$ are individually selected from the group of $CH_2$—OH or H.

The above unvinylated oxazoline ester combines with the polymer to provide a stable, water-dispersible or water-soluble binder that forms excellent finishes. Up to about 15% by weight of the binder can be unvinylated oxazoline ester is in the binder. Usually about 2–15% by weight of the unvinylated oxazoline ester is in the binder.

About 3–20% by weight, based on the weight of the polymer, of an ethylenically unsaturated carboxylic acid is used to form the polymer. Typically useful acids are methacrylic acid, acrylic acid and itaconic acid.

The following are typical acrylic vinyl oxazoline ester polymers which form high quality coating compositions:

(1) about 22–28% by weight of styrene, about 22–28% by weight methyl methacrylate, about 37–43% by weight of a vinyl oxazoline ester (described above) where R is from soya oil fatty acids, about 3–7% by weight of lauryl methacrylate and about 3–7% by weight of acrylic acid;

(2) about 22–28% by weight of styrene, about 22–28% by weight methyl methacrylate about 37–43% by weight of a vinyl oxazoline ester (described above) where R is from linseed oil fatty acids and about 8–12% by weight acrylic acid; and (3) about 22–28% by weight of styrene about 22–28% by weight methyl methacrylate, about 37–43% by weight of a vinyl oxazoline ester (described above) where R is from soya oil fatty acids and about 8–12% by weight of acrylic acid.

The acrylic oxazoline ester polymer can also contain up to about 15% by weight, based on the weight of the polymer, of hydroxy alkyl methacrylate or hydroxy alkyl acrylate having 2–4 carbon atoms in the alkyl groups. Generally, about 2–15% by weight, based on the weight of the polymer of these hydroxy alkyl acrylates or methacrylates are used in the polymer. Typical hydroxy alkyl acrylates and methacrylates are hydroxy ethyl acrylate, hydroxy propyl acrylate, hydroxy butyl acrylate, hydroxy ethyl methacrylate, hydroxy propyl methacrylate, hydroxy butyl methacrylate and the like. An example of a polymer of this type contains about 38–45% by weight of methyl methacrylate and/or styrene, 20–50% by weight of vinyl oxazoline ester, 3–20% by weight of an ethylenically unsaturated carboxylic acid and 2–15% by weight of a hydroxy alkyl acrylate or methacrylate. Polymers, such as shown above, can be easily cross-linked with conventional crosslinking agents.

A sufficient amount of a base such as ammonium hydroxide or amine is added to the polymer so that the polymer can be dispersed in water. Additional base can be added to adjust the pH of the resulting composition to about a pH of 7.5–9.5. Typical amines that can be used are primary amines, secondary amines, tertiary amines, polyamines and hydroxyamines, such as ethanolamine, diethanolamine, triethanolamine, n-methylethanol amine, N,N-diethylethanolamine, N-aminoethanolamine, N-methyldiethanolamine, monoisopropanolamine, diisopropanolamine, triisopropanolamine, butanolamine, hexanolamine, methyl diethanolamine, N,N-diethylaminoethylamine, ethylene diamine, diethylene triamine, diethylene tetramine, hexamethylene tetramine, triethylamine and the like.

About 5–75% by weight of the binder can be an alkyd resin having an acid number of about 20–100 preferably 40–60. Generally about 20–30% by weight of alkyd resin is used. The alkyd resin improves application properties of the coating composition, reduces cost, improves flexibility and appearance of finishes of the composition.

These alkyd resins are prepared by conventional polymerization processes in which a drying oil fatty acid, a polyol and a dicarboxylic acid are reacted to form a resin with excess hydroxyl groups. This resin is then reacted with an anhydride of a polycarboxylic acid to form the alkyd resin having the above acid number. Conventional catalysts are used to prepare the alkyd resin. Temperatures of about 100–250° C. for about 0.5–6 hours are used in the process.

Typical drying oil fatty acids used to prepare the alkyd resin are china wood oil fatty acids, linseed oil fatty acids, soya oil fatty acids, tall oil fatty acids, dehydrated castor oil fatty acids, safflower oil fatty acids, linoleic acid and mixtures thereof.

Typical polyols that can be used to prepare the alkyd resin are glycerine, pentaerythritol, trimethylol ethane, trimethylol propane, glycols, such as ethylene glycol, propylene glycol, butane diol, pentane diol and the like.

Typical dicarboxylic acids that can be used to prepare the alkyd resin are phthalic acid, isophthalic acid, terephthalic acid, maleic acid, fumaric acid, succinic acid and the like. Monocarboxylic aromatic acids can also be used such as benzoic acid, paratertiary butylbenzoic acid, phenol acetic acid, triethyl benzoic acid, dimethyl propionic acid and the like.

Typical carboxylic acid anhydrides that can be used are phthalic anhydride, maleic anhydride, succinic anhydride, propionic anhydride, butyric anhydride, trimelletic anhydride, and the like.

One preferred alkyd resin that gives a high quality coating composition is comprised of soya oil fatty acids, phthalic acid or a mixture of isophthalic and terephthalic acids, trimethylol propane and trimellitic anhydride and has an acid number of about 50-60.

The coating composition can contain a plasticizer in an amount of about 5-20% by weight of the binder. The following are typically useful plasticizers: dialkyl ether phthalate, dialkyl phthalate, blown castor oil and the like Generally, the coating composition is pigmented. The pigments are introduced into the coating composition by first forming a mill base with a compatible dispersing resin, such as one of the aforementioned acrylic vinyl oxazoline ester polymers or other acrylic dispersing resin. The mill base is formed by conventional sand grinding, attritor grinding, or ball mill techniques, and then the mill base is blended with the film-forming binder as shown in the Examples.

The following are examples of the great variety of pigments which are used in the coating composition: metallic oxides, preferably titanium dioxide, zinc oxide, iron oxide, and the like, metal hydroxides, metal flakes, such as aluminum flake, bronze flake, "Afflair" pigments, i.e., mica-coated with titanium dioxide, metal powders, chromates, carbon black, silica, talc, china clay, iron blues, organic reds, organic maroons, and other organic pigments.

Small amounts of about 0.1-2.0%, based on the weight of the binder, of conventional metallic driers can be used in the coating composition, such as lead naphthenate, manganese naphthenate, cobalt naphthenate, zirconium naphthenate, zinc naphthenate, calcium naphthenate, and lead tallate.

About 0.1 to 1% by weight, based on the weight of the binder, of ultraviolet light absorbers can be added to the coating composition. Typical ultraviolet light absorbers are substituted benzophenone derivatives, such as 2,4-dihydroxy benzophenone, a polymeric reaction product of orthohydroxy benzophenone/formaldehyde/phenol, dibenzoate of diphenylol propane, nonyl phenyl benzoate, 2,4-dihydroxy-acetophenone, substituted benzotriazoles, such as 2-(2'-hydroxy-5'-methyl phenyl) benzotriazole, and the like.

Also, in addition to the above binder constituents, about 0.5 to 10% by weight, based on the weight of the binder, of cellulose acetate butyrate can be used in the coating composition. The cellulose acetate butyrate generally has a butyryl content of about 30-55% by weight and a viscosity of 0.1-6 seconds determined at 25° C. according to ASTM-D-1343-56.

About 0.01-1% by weight, based on the weight of the binder, of silicone anticratering agents can be used such as polyalkene oxide siloxanes and silicone glycol copolymers.

About 0.1-25% by weight, based on the weight of the binder, of water soluble or water dispersible epoxy resins, epoxy ester resins, polyester, acrylic resins can be added to the composition to provide certain improvements in application and modify characteristics of a finish of the composition after application.

A low bake finish of the composition can be prepared by the addition of about 1-25% by weight based on the weight of the binder, of a compatible crosslinking agent such as an alkylated melamine formaldehyde resin, a urea formaldehyde resin or a benzoguanamine formaldehyde resin. Generally, a catalyst such as partoluene sulfonic acid is used to reduce the curing temperature and curing time. Typical low temperature cures of about 80°-120° C. are used for about 15 minutes to 2 hours to cure this type of composition.

The coating compositions of this invention can be applied to a substrate by any of the usual application methods, such as spraying, electrostatic spraying, dipping, brushing, flow coating and the like. These coatings can be dried at ambient temperatures or baked at a relatively low temperature. The resulting coating is about 0.1-5 mils thick, preferably 1-3 mils thick, and has good gloss. The coating composition of the invention does not yellow noticeably on drying or baking and gives a hard, durable, scratch resistant, gasoline-resistant, weather-resistant, alkali-resistant, glossy coating which is suitable as a finish or a repair finish for automobile and truck bodies. By using suitable pigmentation, the coating composition can also be used as a primer for metals such as used for automobiles and truck bodies.

The following Examples illustrate the invention. All quantities shown are on a weight basis unless otherwise indicated.

EXAMPLE 1

| | Pounds |
|---|---|
| Portion 1 | |
| Ethylene glycol monobutyl ether | 68.39 |
| n-Butanol | 25.99 |
| Portion 2 | |
| Styrene monomer | 51.30 |
| Methyl methacrylate monomer | 51.30 |
| Vinyl oxazoline ester | 82.07 |
| of soya oil fatty acids [reaction product of 1 mole of tris(hydroxy methyl) amino methane with three moles of soya oil fatty acids which is subsequently reacted with 1 mole of formaldehyde using the process of U.S. Pat. No. 3,248,397 issued April 26, 1966] | |
| Lauryl methacrylate monomer | 10.26 |
| Acrylic acid monomer | 6.15 |
| Portion 3 | |
| t-Butyl per benzoate | 7.29 |
| Ethylene glycol monobutyl ether | 17.33 |
| Methyl ethyl ketone | 9.12 |
| Portion 4 | |
| Styrene monomer | 17.09 |
| Methyl methacrylate monomer | 17.09 |
| Vinyl oxazoline ester | 27.36 |
| (described above) | 27.36 |
| Lauryl methacrylate monomer | 3.41 |
| Acrylic acid monomer | 7.53 |
| Total | 401.68 pounds |

Portion 1 is charged into a reactor equipped with a stirrer, reflux condenser, thermometer and a nitrogen inlet valve. Portion 1 is heated to 124° C. under a nitrogen gas blanket. Portions 2 and 3 are premixed. Portion 2 with 22 pounds of Portion 3 are both fed slowly and continuously into the reactor over a 112 minute period with constant agitation while maintaining the temperature of the resulting reaction mixture at about 130° C. Portion 4 is premixed and the remainder of portion 3 and portion 4 are simultaneously fed into the reactor over a 38 minute period while maintaining the reaction mixture at about 130° C. The reaction mixture is held at 130° C. for an additional 90 minutes. A polymer solution is formed.

The resulting polymer solution has a solids content of about 68.9%, a Gardner Holdt viscosity measured at 25° C. of Z5 + ½, the polymer has an acid number of 37.4. The polymer is of methyl methacrylate/styrene/vinyl oxazoline ester of soya oil fatty acids/lauryl methacrylate/acrylic acid in a weight ratio of 25/25/40/5/5. The polymer has a number average molecular weight of about 4490 and a weight average molecular weight of about 29,300 determined by gel permeation chromatography using polystyrene as the standard.

White Mill Base

A white mill base is prepared by charging the following ingredients into a mixing vessel:

|  | Pounds |
|---|---|
| Portion 1 | |
| Polymer solution (prepared above) | 90.81 |
| Triethylamine | 2.80 |
| Portion 2 | |
| Water | 181.36 |
| Triethylamine | 1.60 |
| Water | 55.00 |
| Titanium dioxide pigment | 325.03 |
| Total | 656.60 pounds |

Portion 1 is charged into the mixing vessel and mixed for 30 minutes. Portion 2 is added to portion 1 and mixed for an additional 30 minutes. The resulting mixture is charged into a conventional sand mill and ground to a 0.5 mil fineness. The resulting white mill base has a pH of about 9.0, a viscosity measured at 25° C. of about 475 centipoises.

White Paint

A white paint is prepared by thoroughly blending together the following constituents in a mixing vessel.

|  | Pounds |
|---|---|
| Polymer Solution (prepared above) | 134.08 |
| Triethylamine | 4.08 |
| Cobalt naphthenate drier solution (54% solids in mineral sirits containing 6% by weight cobalt) | 1.82 |
| Water | 152.28 |
| White Mill Base (prepared above) | 107.74 |
| Water | 28.00 |
| Total | 428.00 |

The resulting paint has a viscosity of 55 seconds measured at 25° C. in a No. 2 Zahn cup, a pH of 8.5 and a solids content of about 37%.

The above paint is sprayed over two sets of steel panels and the applied paint is dried at room temperature. One set of panels has the steel coated with an iron phosphate coating; the second set of panels has the steel coated with an iron phosphate coating and an alkyd resin black dip primer.

The following tests were conducted on the painted panels:

|  | Phosphate coated steel panels | Alkyd resin primer phosphate coated steel panels |
|---|---|---|
| Dried Film Thickness | 2.1–2.5 mils | 2.1–2.5 mils. |
| Gloss measured at | | |
| 20° | 86 | 88 |
| 60° | 93 | 94 |
| Distinctness of Image | 9+ | 9 |
| Drying Time | | |
| Tack Free | 5¼ hours | 5¼ hours |
| Tape Free | Moderate Marking at 5¼ hours | Bad Marking at 5¼ hours |
| Water Spot Resistance | | |
| 3 hours | poor | poor |
| 6 hours | poor | poor |
| 24 hours | slight ring | slight ring |
| 48 hours | very slight ring | very slight ring |
| 7 days | acceptable | acceptable |
| Gasoline Resistance | | |
| 24 hours | trace marking | trace marking |
| 7 days | acceptable | acceptable |
| Adhesion | | |
| 24 hours | — | acceptable |
| 7 days | — | " |
| Hardness | | |
| 2 days | 0.9 knoops | — |
| 7 days | 1.4 knoops | — |
| Humidity Resistance | | |
| (96 hours exposure) | | |
| Bistering | — | none |
| Wet Adhesion | — | good |
| Gloss Retention(measured at 20°) | | |
| (Q.U.V. Weather-O-Meter) | | |
| 100 hours | — | 66% |
| 200 hours | — | 71% |
| 300 hours | — | 71% |

All of the above tests are standard tests used for automotive paints and well known by those skilled in the art. The tests show that the above paint forms finishes that are acceptable for automobiles and trucks and will withstand outdoor weathering.

EXAMPLE 2

|  | grams |
|---|---|
| Portion 1 | |
| Styrene monomer | 248 |
| n-Butanol | 80 |
| Portion 2 | |
| Styrene monomer | 150 |
| Methyl methacrylate monomer | 150 |
| Vinyl oxazoline ester of linseed oil fatty acids (prepared according to the procedure described in Example 1 except linseed oil fatty oil fatty acids are used instead of soya oil fatty acids) | 240 |
| Acrylic acid monomer | 60 |
| Ethylene glycol monobutyl ether | 60 |
| Ditertiary butyl peroxide | 12 |
| Total | 1000 grams |

Portion 1 is charged into a two liter reaction vessel equipped as in Example 1 and heated to its reflux temperature under a nitrogen gas blanket. Portion 2 is premixed and charged at a uniform rate into the vessel over a two hour period and then held at reflux for a four hour period to form a polymer solution.

The resulting polymer solution has a solids content of about 61%, an acid number of about 65.5, a Gardner Holdt viscosity measured at 25° C. of about Z6+. The polymer is of methyl methacrylate/styrene/vinyl oxazoline ester of linseed oil fatty acids/acrylic acid in a weight ratio of 25/25/40/10 and has a number average molecular weight of about 5610 and a weight average molecular weight of about 96,700 determined as in Example 1.

White Mill Base

A white mill base is prepared by charging the following constituents into a mixing vessel:

| Portion 1 | grams |
| --- | --- |
| Polymer solution(prepared above) | 105.37 |
| Ammonium hydroxide | 4.23 |
| Water | 165.37 |
| Titanium Dioxide Pigment | 325.03 |
| Portion 2 | |
| Water | 100.00 |
| Total | 700.00 grams |

Portion 1 is charged into the mixing vessel and thoroughly mixed and then portion 2 is added and mixed. The resulting mixture is charged into a sand mill and ground to a 0.5 mil fineness to form a mill base having a pH of about 9.2, a viscosity measured at 25° C. of about 575 centipoises and a pigment to binder ratio of about 500/100.

White Paint

A white paint is prepared by thoroughly blending together the following constituents in a mixing vessel:

| Portion 1 | grams |
| --- | --- |
| Polymer solution(prepared above) | 68.07 |
| Ammonium hydroxide | 2.74 |
| Cobalt naphthenate drier solution(described in Example 1) | 0.79 |
| Water | 52.23 |
| White Mill Base(prepared above) | 51.17 |
| Portion 2 | |
| Water | 75.00 |
| Total | 250.00 |

The resulting paint has a viscosity of about 55 seconds measured at 25° C. in a No. 2 Zahn cup, a pH of about 8 and a 28% solids content.

The above paint is sprayed over two sets of steel panels and the applied paint is dried at room temperature. One set of panels has the steel coated with an iron phosphate coating; the second set of panels has the steel coated with an iron phosphate coating and an alkyd resin black dip primer.

The following tests were conducted on the painted panels:

| | Phosphate coated steel panels | Alkyd resin primer phosphate coated steel panels |
| --- | --- | --- |
| Dried Film Thickness | 1.8–1.9 mils | same |
| Gloss measured at | | |
| 20° | 72 | 74 |
| 60° | 90 | 90 |
| Distinctness of Image | — | 5+ |
| Drying Time | | |
| Tack Free | 1½ hours | same |
| Tape Free | 4 hours | 4 hours |
| Water Spot Resistance | | |
| 3 hours | slight | — |
| 6 hours | trace of a ring | — |
| 24 hours | acceptable | — |
| Gasoline Resistance | | |
| 24 hours | acceptable | — |
| Adhesion | | |
| (10 Maximum adhesion) | | |
| 24 hours | — | 2 |
| 48 hours | 8 | 2 |
| 4 days | 8–9 | 7 |
| 7 days | 9 | 7 |
| Hardness | | |
| 24 hours | — | 2.9 knoops |
| 48 hours | — | 6.1 knoops |
| 7 days | — | 8.1 knoops |
| Humidity Resistance | | |
| (96 hours exposure) | | |
| Bistering | very small blistering | — |
| Wet Adhesion | 10 | — |
| Yellowing | moderate | |
| Gloss Loss | slight | |
| Gloss Retention(measured at 20°) | | |
| (Q.U.V. Weather-O-Meter) | | |
| 50 hours | 93% | — |
| 100 hours | 93% | — |
| 200 hours | 84% | — |
| 300 hours | 83% | — |
| 400 hours | 70% | — |

All of the above tests are standard tests used for automotive paints and well known by those skilled in the art. The tests show that the above paint forms finishes that are acceptable for automobiles and trucks and will withstand outdoor weathering.

EXAMPLE 3

| Portion 1 | Grams |
| --- | --- |
| Ethylene glycol monobutyl ether | 248 |
| n-Butanol | 80 |
| Portion 2 | |
| Styrene monomer | 150 |
| Methyl methacrylate monomer | 150 |
| Vinyl oxazoline ester of soya oil fatty acids (described in Example 1) | 240 |
| Acrylic acid monomer | 60 |
| Ethylene glycol monobutyl ether | 60 |
| Di-tertiary butyl peroxide | 12 |
| Total | 1000 grams |

Portion 1 is charged into a two liter reaction vessel equipped as in Example 1 and heated to its reflux temperature under a nitrogen gas blanket. Portion 2 is premixed and charged at a uniform rate into the vessel over a two hour period and then held at reflux for a four hour period to form a polymer solution.

The resulting polymer solution has a solids content of about 63%, an acid number of about 62, a Gardner Holdt viscosity of about Z5 measured at 25° C. The polymer is of methyl methacrylate/styrene/vinyl oxazoline ester of soya oil fatty acids/acrylic acid in a weight ratio fo about 25/25/40/10 and has a number average molelcular weight of about 4150 and a weight average molecular weight of about 53,330 determined as in Example 1.

White Mill Base

A white mill base is prepared by charging the following constituents into a mixing vessel:

| Portion 1 | Grams |
|---|---|
| Polymer solution (prepared above) | 95.82 |
| Ammonium Hydroxide | 3.90 |
| Water | 200.28 |
| Titanium dioxide pigment | 300.00 |
| Portion 2 | |
| Water | 42.00 |
| Ammonium hydroxide | 3.50 |
| Total | 645.50 grams |

Portion 1 is charged into a mixing vessel and then portion 2 is added and mixed. The resulting mixture is charged into a sand mill and ground to a 0.5 mil fineness to form a mill base having a pH of about 9, a viscosity measured at 25° C. of about 525 centipoises and a 55% solids content.

White Paint

A white paint is prepared by thoroughly blending together the following constituents in a mixing vessel:

| Portion 1 | grams |
|---|---|
| Polymer solution(prepared above) | 252.8 |
| Ammonium hydroxide | 10.3 |
| Cobalt naphthenate drier solution(described in Example 1) | 3.0 |
| Water | 298.4 |
| White Mill Base(prepared above) | 189.0 |
| Portion 2 | |
| Water Total | 915.00 |

The resulting paint has a viscosity of about 51 seconds measured at 25° C. in a No. 2 Zahn cup, a pH of about 7.8 and a 28.8% solids content.

The above paint is sprayed over two sets of steel panels and the applied paint is dried at room temperature. One set of panels has the steel coated with an iron phosphate coating; the second set of panels has the steel coated with an iron phosphate coating and an alkyd resin black dip primer.

The following tests were conducted on the painted panels:

| | Phosphate coated steel panels | Alkyd resin primer phosphate coated steel panels |
|---|---|---|
| Dried Film Thickness | 1.8-1.9 mils | same |
| Gloss measured at | | |
| 20° | 81 | 79 |
| 60° | 92 | 91 |
| Distinctness of Image | 7 | 6 |
| Drying Time | | |
| Tack Free | 1¾ hours | 1¾ hours |
| Tape Free | 4-5 hours | 4-5 hours |
| Water Spot Resistance | | |
| 3 hours | slight | — |
| 6 hours | trace of a ring | — |
| 24 hours | acceptable | — |
| Gasoline Resistance | | |
| 24 hours | acceptable trace marking | — |
| 7 days | acceptable | — |
| Adhesion | | |
| (Maximum Adhesion-10) | | |
| 24 hours | — | 2 |
| 3 days | — 7 | |
| 7 days | — | 8 |
| Hardness | | |
| 3 days | 4.9 knoops | |
| 7 days | 7.8 knoops | |
| Humidity Resistance | | |
| (96 Hours Exposure) | | |
| Bistering | — | none |
| Wet Adhesion | — | 10 |
| Yellowing | — | moderate |
| Gloss Loss | — | none |
| % Gloss Retention(measured at 20°) | | |
| (Q.U.V. Weather-O-Meter) | | |
| 100 hours | 78% | — |
| 200 hours | 74% | — |
| 300 hours | 74% | — |
| 400 hours | 68% | — |

All of the above tests are standard tests used for automotive paints and well known by those skilled in the art. The tests showed that the above paint forms finishes that are acceptable for automobiles and trucks and will withstand outdoor weathering.

EXAMPLE 4

A coating composition is prepared by charging the following ingredients into a mixing vessel:

| Portion 1 | Grams |
|---|---|
| Polymer solution (prepared in Example 2) | 20.00 |
| Alkyd Resin Solution (75% alkyd resin solids in water in which the alkyd resin is of linoleic fatty acid/linseed oil fatty acids/trimethylol propane/isophthalic acid/ terephthalic acid/trimellitic anhydride having an acid No. of 41) | 5.40 |
| Aqueous ammonium hydroxide solution (29% ammonium hydroxide) | 1.00 |
| Water | 57.00 |
| Portion 2 | |
| Methyl ethyl ketone | 0.04 |
| Cobalt naphthenate drier solution(described in Example 1) | 0.42 |
| Manganese naphthenate drier solution(54% solids in mineral spirits containing 6% by weight manganese) | 0.42 |
| Total | 84.28 |

The ingredients of portion 1 are added to a mixing vessel in the order shown and thoroughly mixed for about 30 minutes. Portion 2 is added and thoroughly mixed with portion 1 to provide a clear coating composition that has a viscosity measured at 25° C. in a No. 2 Zahn cup of 41 seconds and a pH of about 7.9.

The coating composition is sprayed onto iron phosphate coated cold roll steel panels and dried at ambient temperatures to provide a 1.4 mil thick film. The film has the following properties:

| Pencil Hardness | |
|---|---|
| 24 hours | HB |
| 7 days | H |
| Tack Free Dry Time | less than 4 hours |
| Adhesion | Excellent |
| Gloss | Very good |
| Solvent resistance (7 days) | acceptable. |

A fellow mill base is prepared as follows:

| Portion 1 | Grams |
|---|---|
| Alkyd resin solution (described above) | 727.0 |
| Aqueous ammonium hydroxide solution(29% ammonium hydroxide) | 26.0 |
| Propyl ether propylene glycol | 51.9 |
| Water | 151.6 |
| Antifoam Agent(Foam Master B) | 60.0 |
| Lead naphthenate drier solution (lead naphthenate in mineral spirits 24% lead content) | 35.1 |
| Portion 2 | |
| Yellow iron oxide pigments | 286.6 |
| Titanium dioxide pigment | 56.9 |
| Strontium chromate pigment | 168.4 |
| Molybdate orange pigment | 26.0 |
| Lead chromate pigment | 1086.0 |
| Water | 1230.0 |
| Methyl ethyl ketoxime | 2.7 |
| Ammonium hydroxide solution (described above) | 5.0 |
| Total | 3913.2 |

Portion 1 is charged into a mixing vessel and mixed thoroughly. Portion 2 is added and thoroughly mixed with portion 1. The resulting mixture is ground in a conventional sand mill to a 0.5 mil fineness.

A yellow paint is prepared as follows:

| Portion 1 | Grams |
|---|---|
| Alkyd resin solution (described above) | 3.33 |
| Polymer solution (prepared in Example 2) | 36.90 |
| Ammonium hydroxide solution (described above) | 1.65 |
| Water | 83.70 |
| Portion 2 | |
| Methyl ethyl ketoxime | 0.06 |
| Yellow mill base (prepared above) | 36.00 |
| Cobalt naphthenate drier solution (described in Example 1) | 0.75 |
| Total | 162.39 |

Portion 1 is charged into a mixing vessel and thoroughly mixed. The ingredients of portion 2 are added in the order shown and thoroughly mixed with portion 1. The resulting paint has a pigment to binder ratio of about 50/100 and a viscosity of 47 seconds measured at 25° C. in a No. 4 Zahn cup. The binder contains about 25% by weight of alkyd resin and about 75% by weight of polymer (acrylic vinyl oxazoline ester polymer).

The above paint is reduced to a spraying viscosity with water and sprayed onto cold roll steel panels coated with iron phosphate. The resulting finish was about 2 mils thick and dried tack free in about 4 hours. After 24 hours the finish had good adhesion to the substrate and has a good hardness.

I claim:

1. An aqueous coating composition comprising about a 5-60% by weight, based on the weight of the coating composition, of a film forming binder and 40-95% by weight, based on the weight of the coating composition, of an aqueous medium; wherein the film forming binder comprises a polymer consisting essentially of polymerized monomers of about (a) 22-28% by weight, based on the weight of the polymer, of styrene;
   (b) 22-28% by weight, based on the weight of the polymer, of methyl methacrylate;
   (c) 37-43% by weight, based on the weight of the polymer, of vinyl oxazoline ester of the formula

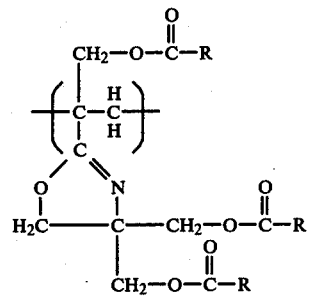

where R is the residue of a drying oil fatty acid selected from the group consisting of soya oil fatty acids, linseed oil fatty acids, tall oil fatty acids or mixtures thereof;
   (d) 3-7% by weight, based on the weight of the polymer, of lauryl methacrylate; and
   (e) 3-7% by weight, based on the weight of an ethylenically unsaturated carboxylic acid selected from the group consisting of acrylic acid and metharylic acid; and containing sufficient ammonia or amine to provide a pH of about 7.5-9.5.

2. The coating composition of claim 1 containing up to 20% by weight, based on the weight of the coating composition of an organic solvent for the film forming binder.

3. The coating composition of claim 1 in which the polymer contains up to 10% by weight of an alkyl methacrylate having 6-12 carbon atoms in the alkyl group.

4. The coating composition of claim 1 containing in addition to the film forming binder pigment in a pigment to binder weight ratio of about 0.1/100 to about 300/100.

5. The coating composition of claim 4 wherein the binder consists essentially of about (A) 70-80% by weight, based on the weight of the binder, of a polymer consisting essentially of polymerized monomers of about
   (a) 22-28% by weight, based on the weight of the polymer, of styrene;
   (b) 22-28% by weight, based on the weight of the polymer, of methyl methacrylate;
   (c) 37-43% by weight, based on the weight of the polymer of vinyl oxazoline ester in which R is the residue of soya oil fatty acids and
   (d) 3-7% by weight, based on the weight of the polymer, of lauryl methacrylate; and
   (e) 3-7% by weight, based on the weight of the polymer, of acrylic acid;
   (B) 20-30% by weight, based on the weight of the binder, of an alkyd resin of a drying oil fatty acid, a polyol, a dicarboxylic acid and an anhydride of a polycarboxylic acid and having an acid number of about 40-60.

6. The coating composition of claim 5 in which the alkyd resin is of soya oil fatty acids, phthalic acid, or a mixture of isophthalic acid and terephthalic acid, trimethylol propane and trimellitic anhydride having an acid number of about 50–60.

7. A steel substrate coated with a paint layer which is subsequently coated with about a 0.1–5 mil thick dried layer of the composition of claim 4.

8. The coating composition of claim 1 containing about 0.1–2.0% by weight, based on the weight of the binder, of a metallic drier.

9. The coating composition of claim 1 containing about 0.1–1.0% by weight, based on the weight of the binder, of an ultraviolet light absorber.

10. The coating composition of claim 1 containing about 0.5 to 10% by weight, based on the weight of the binder, of cellulose acetate butyrate.

11. The coating composition of claim 1 containing about 0.01–1.0% by weight, based on the weight, based on the weight of the binder, of a silicone anticratering agent.

12. The coating composition of claim 1 in which the polymer contains up to about 15% by weight of a hydroxyalkyl acrylate or a hydroxyalkyl methacrylate having 2–4 carbon atoms in the alkyl groups.

13. The coating composition of claim 1 in which the polymer contains up to 15% by weight, based on the weight of the binder, of an oxazoline ester of the formula

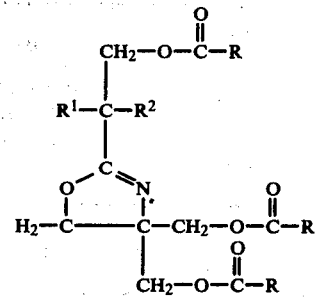

wherein R is defined in claim 1 and $R^1$ and $R^2$ are individually selected from the group consisting of $CH_2OH$ and H.

14. The coating composition of claim 1 in which the binder consists essentially of 25–95% by weight of the polymer and 5–75% by weight of an alkyd resin having an acid number of 20–200.

15. The coating composition of claim 14 in which the alkyd resin is of a drying oil fatty acid, a polyol, a dicarboxylic acid and an anhydride of a polycarboxylic acid.

16. The coating composition of claim 15 in which the alkyd resin is of soya oil fatty acids, phthalic acid or a mixture of isophthalic acid and terephthalic acid, trimethylol propane and trimellitic anhydride.

17. A metal substrate coated with about 0.1–5.0 mil thick dried layer of the composition of claim 1.

* * * * *